(12) United States Patent
Paul et al.

(10) Patent No.: US 8,375,781 B2
(45) Date of Patent: Feb. 19, 2013

(54) ARRANGEMENT FOR DETERMINING THE PRESSURE IN AN UNDERCARRIAGE TYRE OF AN AIRCRAFT

(75) Inventors: Manfred Paul, Nackenheim (DE);
Stefan Schoellmann, Kiel (DE)

(73) Assignee: Lufthansa Technik AG, Hamburg (DE)

(*) Notice: Subject to any disclaimer, the term of this patent is extended or adjusted under 35 U.S.C. 154(b) by 79 days.

(21) Appl. No.: 12/818,027

(22) Filed: Jun. 17, 2010

(65) Prior Publication Data

US 2011/0185802 A1    Aug. 4, 2011

Related U.S. Application Data

(60) Provisional application No. 61/187,681, filed on Jun. 17, 2009.

(51) Int. Cl.
*G01P 13/00* (2006.01)
(52) U.S. Cl. .................................................. 73/170.02
(58) Field of Classification Search ............... 73/170.02, 73/700–756
See application file for complete search history.

(56) References Cited

U.S. PATENT DOCUMENTS

| | | | | |
|---|---|---|---|---|
| 4,450,716 A | * | 5/1984 | Lefaucheux et al. | 73/146.5 |
| 7,343,787 B2 | * | 3/2008 | Oflaz | 73/146 |
| 2005/0150283 A1 | * | 7/2005 | Shick et al. | 73/146 |
| 2006/0144997 A1 | * | 7/2006 | Schmidt et al. | 244/100 R |
| 2007/0186634 A1 | * | 8/2007 | Burghardt et al. | 73/146 |
| 2008/0033607 A1 | * | 2/2008 | Zeliff et al. | 701/29 |

FOREIGN PATENT DOCUMENTS

| | | |
|---|---|---|
| EP | 0656269 | 6/1995 |
| EP | 0656269 A1 | 6/1995 |
| WO | WO00/11442 | 3/2000 |
| WO | WO2006/003467 | 1/2006 |
| WO | WO2008/034411 A1 | 3/2008 |
| WO | WO2008/034414 A1 | 3/2008 |

OTHER PUBLICATIONS

International Search Report and Written Opinion for Int'l Application No. PCT/EP2010/003675, Nov. 24, 2010.
English Translation of the International Search Report for Int'l Application No. PCT/EP2010/003675, Nov. 24, 2010.
English Translation of the Written Opinion for Int'l Application No. PCT/EP2010/003675, Nov. 24, 2010.

* cited by examiner

*Primary Examiner* — Andre Allen
(74) *Attorney, Agent, or Firm* — Casimir Jones, S.C.

(57) ABSTRACT

The subject matter of the invention is an arrangement for determining the pressure in an undercarriage tire of an aircraft, which arrangement has a measurement matrix (1) with a plurality of load sensors which are arranged in an area over which the aircraft tire can roll. The invention provides that the arrangement is designed to measure the pressure difference between two or more undercarriage tires.

7 Claims, 1 Drawing Sheet

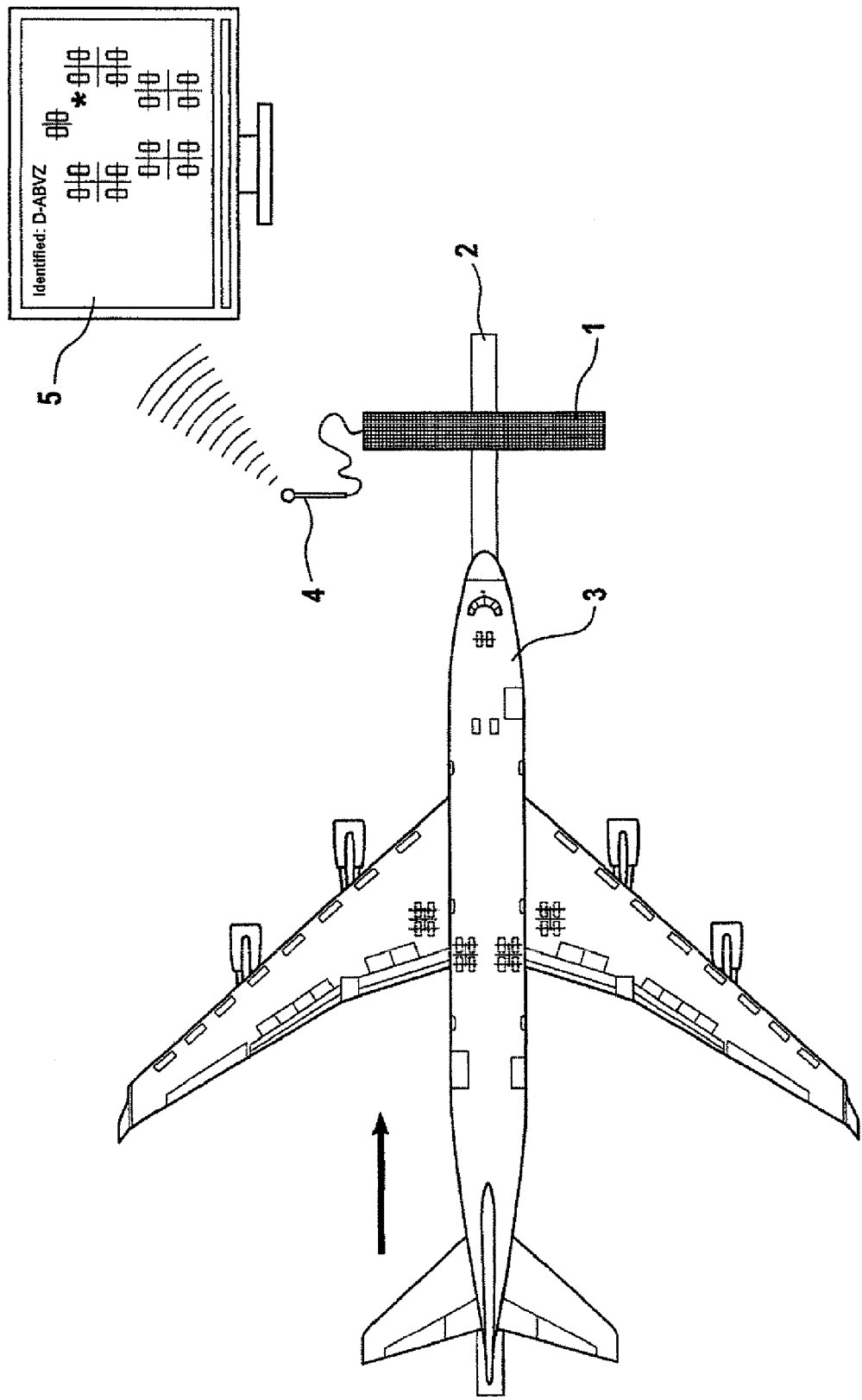

ARRANGEMENT FOR DETERMINING THE PRESSURE IN AN UNDERCARRIAGE TYRE OF AN AIRCRAFT

This application claims priority to U.S. Provisional Application Ser. No. 61/187,681 filed Jun. 17, 2009 and claims the benefit of German Application No. 10 2009 025245.2-52, filed Jun. 17, 2009.

The invention relates to an arrangement for determining the pressure in an undercarriage tyre of an aircraft, which arrangement has a measurement matrix with a plurality of load sensors which are arranged in an area over which the aircraft tyre can roll.

The subject matter of the invention is furthermore a method for determining the pressure in an undercarriage tyre of an aircraft, as well as a servicing cycle for an aircraft.

The tyre pressure of commercial aircraft must be checked regularly since undercarriage tyres are subject to high loads during take-offs and in particular landings. This tyre pressure check is normally carried out in the course of the so-called Z check every 24 h for short-haul aircraft or, if appropriate, every 49 h in the case of long-haul aircraft. This involves effort since the check of the tyre pressure is frequently the only item to be checked in the Z check and also requires a mechanic to approach the parking aircraft.

It is known (EP 0 656 269 A1, WO 2008/034411 A1, WO 2008/034414 A1) for the pressure in the interior of an aircraft tyre to be determined by evaluating the two-dimensional load profile when taxiing over a measurement matrix comprising force and load sensors.

The invention is based on the object of providing an arrangement and a method which allow the tyre pressure of undercarriage tyres to be monitored in a manner satisfying the stringent requirements in the field of aviation.

The arrangement according to the invention is designed for measuring the pressure difference between two or more undercarriage tyres. In particular, pressure differences can be measured between two or more undercarriage tyres on one axle. The invention has identified that, in the course of the Z checks, the check for possible damage to or irregularities in individual undercarriage tyres is particularly important, and this is frequently evident in a greater pressure loss. This pressure difference determination makes it possible, for example, to carry out an additional manual check of the tyre pressure and/or of the tyres even when the absolute pressure of all the tyres is actually still within a predetermined tolerance band, but the pressure loss between comparable tyres is of a different magnitude. A further advantage of this pressure difference determination is that this can be carried out with comparatively high accuracy since, for example, two tyres on one axle at the same pressure and the same temperature should have an identical load profile and, in consequence, any discrepancy of the load profile will frequently be a direct indicator of a corresponding pressure difference.

The technology for determining the internal pressure in a tyre from the load profile of a measurement matrix when taxiing over this measurement matrix is fundamentally known in the prior art and, for example, is described in the three laid-open specifications cited initially. In this case, a matrix of load sensors records a distribution of the force exerted on the individual sensors while the tyre contact surface is taxiing over the matrix. The tyre internal pressure can be deduced from this force and load distribution and further known parameters (for example weight and axle load of the aircraft). For the purposes of the invention, the area of an individual load sensor is considerably smaller than the contact area of an aircraft tyre taxiing over it.

In a particularly preferred embodiment, the invention has at least one temperature sensor for measuring the tyre temperature. This makes it possible to determine the tyre pressure from the load profile of the tyre sufficiently accurately by means of the measurement matrix of load sensors, in order to allow the tyre pressure to be determined in accordance with the aviation requirements. This temperature determination in the course of the indirect pressure measurement by means of the load profile is particularly important in the field of aviation since the undercarriage tyres are subject to considerable thermal loads during take-offs and in particular during landings and the subsequent braking process. The invention makes it possible to take account of these thermal loads and the temperature changes which result from them in the tyres when determining the pressure, and therefore makes it possible, for example, to determine the pressure shortly after the landing, while the aircraft is taxiing to the gate.

According to the invention, the temperature sensor either makes direct contact with the running surface as the tyre taxis over it, and its temperature is measured, or this may be a sensor which carries out a non-contacting temperature measurement. For example, a pyrometer or a thermal imaging camera may be used. The temperature pick-up may be arranged within the measurement matrix or in an edge of the arrangement with the measurement matrix, which can be taxied over.

For the purposes of the invention, both the combination of the pressure difference measurement with the temperature measurement and with the temperature sensor, and the pressure difference measurement without a temperature sensor and without a temperature measurement are essential to the invention and are covered by the disclosure.

The subject matter of the invention is furthermore an airport which has at least one arrangement according to the invention in the taxiing area. The term "taxiing area" covers every area of the airport on which aircraft park or (preferably) over which aircraft taxi while travelling between the runway and the parking position or gate. Arrangement in a central area of the taxiing area is particularly advantageous, over which a large number or all of the aircraft taxi en route from and to the gate. The required monitoring of the tyre pressure in the course of a Z check can therefore be carried out during the taxiing process, without any additional time penalty or mechanic effort.

The subject matter of the invention is furthermore a method for determining the pressure in one or more undercarriage tyres of an aircraft using an arrangement according to the invention. The method has the following steps:

a) at least two undercarriage tyres taxi over the measurement matrix,
b) the load profiles exerted by the undercarriage tyres on the measurement matrix are determined,
c) the tyre pressure is calculated from the measured values determined in step b),
d) a pressure difference measurement is carried out between two or more undercarriage tyres.

For the purposes of the method according to the invention, the pressure difference measurement that has already been described above between two or more undercarriage tyres is used. In particular, it is possible to compare the pressure of two or more undercarriage tyres on one axle. Since, if the pressures of two tyres on one axle are not the same, the tyre with the higher pressure will be loaded to a considerably greater extent and will therefore wear considerably more quickly, this pressure difference determination can increase the life of a set of aircraft tyres.

Within the scope of the invention, it is possible to determine the temperature of the undercarriage tyre within the range of possible measurement accuracy, and to include the temperature value in the calculation of the tyre pressure. Alternatively, it is possible to carry out the temperature determination just in such a way that a decision can be made as to whether the relevant tyre should be classified as cold or hand-warm. The so-called Aircraft Maintenance Manuals for an aircraft generally specify tyre pressure nominal values for the cold or hand-warm tyre temperature.

For the purposes of the method according to the invention, it is additionally possible to determine the state of wear of the undercarriage tyres. The tyres may have one or more running grooves for this purpose, which are detected as an area of lower load in the measured load profile when taxiing over the measurement matrix. When a groove such as this has been largely or completely worn away, the load profile changes in a corresponding manner, which means that it is possible to deduce the state of wear of the tyre. For the purposes of the invention, it is likewise possible, for example, to use undercarriage tyres whose running groove width varies over the depth of the running groove (for example an approximately V-shaped running groove profile), thus allowing a statement to be made about the state of wear of the tyres even before the wear limit is reached, on the basis of the continuously changing load profile.

The subject matter of the invention is furthermore a servicing cycle for an aircraft, which has the following steps:
a) the aircraft is operated over a time period of 12 to 96 h,
b) the pressure in each undercarriage tyre is determined by means of a method according to one of claims 7 to 10,
c) the measurement results from step b) are evaluated in order to determine whether the pressure in at least one tyre is below a lower limit value and/or whether the pressure differences between two or more undercarriage tyres are greater than an upper tolerance value,
d) the tyre pressure is adjusted if a lower limit value has been undershot or an upper tolerance value has been exceeded.

A servicing cycle such as this allows an aircraft to be operated safely and cost-effectively at the same time.

According to the Aircraft Maintenance Manual for a typical commercial aircraft, the permissible lower limit for operation of the undercarriage tyres is 80% of the rated pressure. The pressure loss in an undercarriage tyre should be at most 5% in 24 h, and a typical empirical value in practice is about 2%. A servicing cycle with the aircraft being operated for a maximum of 96 h for carrying out the next tyre pressure check therefore ensures that the technically permissible lower limit (the lower limit value) of the tyre pressure is not undershot. Preferred time periods between two tyre pressure checks are 24 to 72 h, furthermore preferably 24 or 48 h. For the purposes of the invention, it is possible to carry out an additional manual check of the tyres and, if appropriate, replenishment with gas (preferably nitrogen) on every occasion, for example after 96 h.

A range from 80 to 95% of the nominal pressure, preferably 85 to 95% of the nominal pressure, is regarded as a lower limit value, with the tyre pressure being replenished if this is undershot. A difference of 5% or less, furthermore preferably 4, 3 or 2% or less, may be regarded as an upper tolerance value for the pressure difference between two or more tyres (preferably two or more tyres on one axle).

One exemplary embodiment will be explained in the following text with reference to the drawing which shows, schematically, an arrangement according to the invention in the taxiing area.

DESCRIPTION OF THE DRAWING

The FIGURE provides a schematic diagram of an exemplary embodiment. A measurement matrix, which is indicated schematically at 1 is arranged in a taxiing area and is composed of load sensors whose greatest extent is arranged transversely with respect to the intended taxiing direction 2 of an aircraft 3 taxiing over it. The width of the measurement matrix transversely with respect to the taxiway 2 corresponds at least to the undercarriage width of an aircraft taxiing over it, as a result of which, when an aircraft is taxiing centrally over the measurement matrix 1 on the taxiway 2, all of the undercarriage tyres taxi over the load sensors of the measurement matrix. Temperature sensors, which are not illustrated in the drawing, are arranged in the edge of the measurement matrix 1 and measure the temperature of a tyre taxiing over them. The measurement results are transmitted in a wire-free manner to an evaluation unit 5 by means of an antenna, which is indicated at 4, and the measurement results transmitted from the load sensors of the measurement matrix 1 are evaluated, and are displayed in the desired manner. The measurement results from the temperature sensors are correspondingly also transmitted, and are included in the evaluation.

Furthermore, the measurement matrix 1 may have an associated device for identification of the aircraft taxiing over it, for example a camera which reads the aircraft identification from the tail, and transmits this to the evaluation unit 5.

The invention claimed is:

1. Servicing cycle for an aircraft, having the following steps:
   i) the aircraft is operated over a time period of 12 to 96 h,
   ii) the pressure in each undercarriage tyre of the aircraft is determined by means of a method using an arrangement for measuring the differences in pressure in between two or more undercarriage tyres of an aircraft, which arrangement comprises:
      a) a measurement matrix (1) with a plurality of load sensors which are arranged in an area over which undercarriage tyres of the aircraft can roll;
      b) at least one temperature sensor for measuring the temperature of undercarriage tyres of the aircraft; and
      c) an evaluation unit (5) configured to receive pressure and temperature measurement results from said measurement matrix (1) and said at least one temperature sensor,
   wherein said method comprises the following steps:
      1) at least two undercarriage tyres of the aircraft taxi over said measurement matrix,
      2) load profiles exerted by the undercarriage tyres of the aircraft on the measurement matrix are determined,
      3) a tyre pressure is calculated for each of said at least two undercarriage tyres of the aircraft from the measured values determined in step 2),
      4) temperature measurement results are determined for each of said at least two undercarriage tyres of the aircraft, and
      5) a pressure difference measurement is carried out between said at least two undercarriage tyres of the aircraft;
   iii) the measurement results from step ii) are evaluated to determine whether the pressure in at least one tyre is below a lower limit value and/or whether the pressure differences between two or more undercarriage tyres of the aircraft are greater than an upper tolerance value,
   iv) the tyre pressure is adjusted if a lower limit value has been undershot or an upper tolerance value has been exceeded.

2. Servicing cycle according to claim 1, wherein the aircraft is operated over a time period of 24 to 72 h.

3. Servicing cycle according to claim 1, wherein the lower limit value is 80 to 95% of the nominal pressure.

4. Servicing cycle according to claim 1, wherein the upper tolerance value is 5% or less.

5. Servicing cycle according to claim 1, wherein the aircraft is operated over a time period of 24 to 48 h.

6. Servicing cycle according to claim 1, wherein the lower limit value is 85 to 90% of the nominal pressure.

7. The arrangement of claim 1, wherein said measurement matrix (1) and said at least one temperature sensor are configured for wire-free transmission of measurement results to said evaluation unit (5).

* * * * *